United States Patent [19]

Ziegler

[11] Patent Number: 5,099,342
[45] Date of Patent: Mar. 24, 1992

[54] SCANNER DRUM VIEWING SYSTEM AND LIGHT SOURCE ASSEMBLY

[76] Inventor: Richard Ziegler, 7 Commodore Dr., Brick Town, N.J. 08723

[21] Appl. No.: 538,707

[22] Filed: Jun. 15, 1990

[51] Int. Cl.$^5$ .............................................. H04N 1/06
[52] U.S. Cl. .................................... 358/487; 358/490; 358/493
[58] Field of Search ............... 358/487, 489, 490, 491, 358/493; 355/104, 105, 117; 356/424

[56] References Cited

U.S. PATENT DOCUMENTS

| | | | |
|---|---|---|---|
| 2,548,783 | 4/1951 | Goldsmith | 178/5.2 |
| 2,721,231 | 10/1955 | Wise | 178/69.5 |
| 3,639,060 | 2/1972 | Jaskowsky | 355/104 |
| 4,189,741 | 2/1980 | Klopsch | 358/76 |
| 4,473,848 | 9/1984 | Juergensen | 358/294 |
| 4,613,896 | 9/1986 | Takita et al. | 358/76 |
| 4,684,979 | 8/1987 | Hirosawa | 358/75 |
| 4,816,923 | 3/1989 | Saotome | 358/292 |
| 4,899,214 | 2/1990 | Robbins et al. | 358/75 |

Primary Examiner—Leo H. Boudreau
Assistant Examiner—Andrew W. Johns
Attorney, Agent, or Firm—Clifford G. Frayne

[57] ABSTRACT

The light source assembly dimensions to be removably positioned within a standard scanning drum utilized in the graphic arts industry, the assembly having a housing containing a 5000K light source, the housing have a viewing lens secured to the housing, the viewing lens rotatable from a closed position to an open position, the closed position permitting the insertion of the light source assembly into the scanner drum and the open position expanding to the lens to approximate the circumference of the scanner drum, the lens being of a flexible diffused material, thereby providing a 5000K light source from within the scanner drum illuminating the transparencies to be examined and viewed which are on the outer circumference of the scanner drum.

10 Claims, 4 Drawing Sheets

SCANNER DRUM VIEWING SYSTEM AND LIGHT SOURCE ASSEMBLY

FIELD OF INVENTION

The present invention relates to the graphic arts printing industry and, in particular, to a light source assembly and process for enabling the efficient and accurate color comparison of a photo transparency and its negative proof generated by means of electro-optical scanning apparatus.

BACKGROUND OF THE INVENTION

The printing industry and, in particular, the graphic arts industry requires the transfer of photographs in the form of transparencies from the actual transparency to a print medium such as paper. Typically, the publication of a typical weekly magazine requires hundreds of such transfers. In accomplishing the transfers, and, in particular, with respect to the covers of such magazines, great care must be taken to be assured that the transfer of the colors from the transparencies are accurate with respect to printed picture. This is required in that ideally, the color art work or packaging should be aesthetically pleasing to the eye and accurate with respect to the original transparency.

Optical scanning methods and apparatus have been developed which electronically read the transparency and transfer the data to a four color photosensitive material. Examples of these scanning methods can be found in U.S. Pat. Nos. 4,613,896; 4,189,741; 4,684,979; 4,899,214; 4,473,848; and 2,548,783. The aforementioned patents illustrate the variety of methods in which the optical scanner transfers the images and colors read from the transparency to the photosensitive material, referred to in the industry as a proof. Typically, the transparency in a size from 35 mm up to 11×14 inches is positioned on a rotating drum. The scanner drum itself is a transparent hollow plastic cylinder approximately 30 inches in length and approximately 8 inches in diameter with the clear plastic cylinder itself being approximately ⅜ inch in thickness. At each end of the cylinder there are circular mounting plates approximately ½ inch in thickness with an approximately 3½ inch bore in each plate for the accurate centering and positioning of the drum on the scanner itself. The transparency is then mounted on the outer surface of the scanner drum and the drum is placed in the scanner in a horizontal position and is then spun at a high speed as a laser passes over the transparency image reading the image through fiber optics, breaking the image down into four separate colors, yellow, magenta, cyan and black. That information is then transferred to a receiving drum on which negative film is mounted, thus giving the physical four-color film that is necessary for the printing process. Once the initial transfer is made, color adjustments are usually required. The first transfer, representing a four-color proof, is compared with the original transparency. The operator, in accomplishing this comparison, must remove the transparency from the scanner drum and view the transparency on a light box or proof light illuminator.

The standard light source used in the graphic arts industry for the comparison of the transparency and the negative is what is commonly referred to as 5000 Kelvin lighting or 5000 K. This illumination standard is used in that it is a true "white" light that contains all colors of the spectrum in approximately equal amounts. Therefore, it illuminates all color with equal effectiveness and without distortion. Most commercial light sources, such as incandescent or cool-white fluorescent lighting, emphasize some spectrum colors and deemphasize others making them unsuitable for critical appraisal of colors. In making the comparison, the operator would therefore place the transparency on a 5000 K proof-light illuminator and subject the four-color proof to an overhead 5000 K light source. If the proof does not match the transparency under these conditions, the entire procedure of scanning the transparency would then have to be repeated with appropriate color adjustments. This would require resetting the coordinates for the transparency on the scanner drum and reading the transparency again by laser thereby developing a second proof.

As a standard practice, some operators rather than removing the transparency, place the entire scanning drum in front of a 5000 K proof-light illuminator and attempt to interpret the color of the transparency as compared to the four-color proof. Unfortunately, the distance of the transparency mounted on the drum to the surface of the 5000 K light source makes this type of comparison inaccurate and undesirable.

The present invention directs itself to a structure and process whereby the transparency can be viewed while still secured to the standard scanner drum by means of positioning the 5000 K light source within the drum. By means of this apparatus and process described hereafter, the operator can determine the color comparison between the transparency and the proof, and if unsuitable or color adjustments are required, the transparency can then be scanned a second time without the need for the resetting of the coordinates with the optical scanner, thus saving substantial time yet ensuring a critical comparison under the light source conditions which are the standard in the industry.

OBJECTS OF THE INVENTION

An object of the present invention is to provide a novel light source assembly compatible with standard scanner drums which permits the light source to be removably positioned within the scanner drum in order to view transparencies positioned on the outer surface of the scanner drum.

Another object of the present invention is to provide a novel light source assembly which permits comparison of a graphic art transparency with the proof of the transparency without removing the transparency, remounting the transparency and reprogramming the scanner.

A still further object of the present invention is a provide a novel light source assembly which permits the expeditious comparison of a transparency and a proof and the programming required for the transfer of the transparency to the proof.

A still further object of the present invention is to provide for a novel light source assembly which provides accurate and standardized communication and color evaluation for the graphic arts industry.

SUMMARY OF THE INVENTION

A light source assembly dimensioned to be removably positioned within a standard scanning drum, the assembly having a housing having mounted thereon, a 5000 K light source, the housing having a viewing lens secured to the housing by a plurality of lens arms, the viewing lens rotatable from a closed position to an open position, the closed position permitting the insertion of the light source assembly into the scanner drum, and the open position being proximate to the inner circumference of the scanner drum once the light source assembly is positioned therein in order to subject the transparency on the scanner drum to a 5000 K light source from within the drum.

DETAILED DESCRIPTION OF THE DRAWINGS

For a better understanding of the objectives and advantages of Applicant's light source system, an understanding of a standard scanner drum as used in the graphic arts industry is required.

Figure 1:
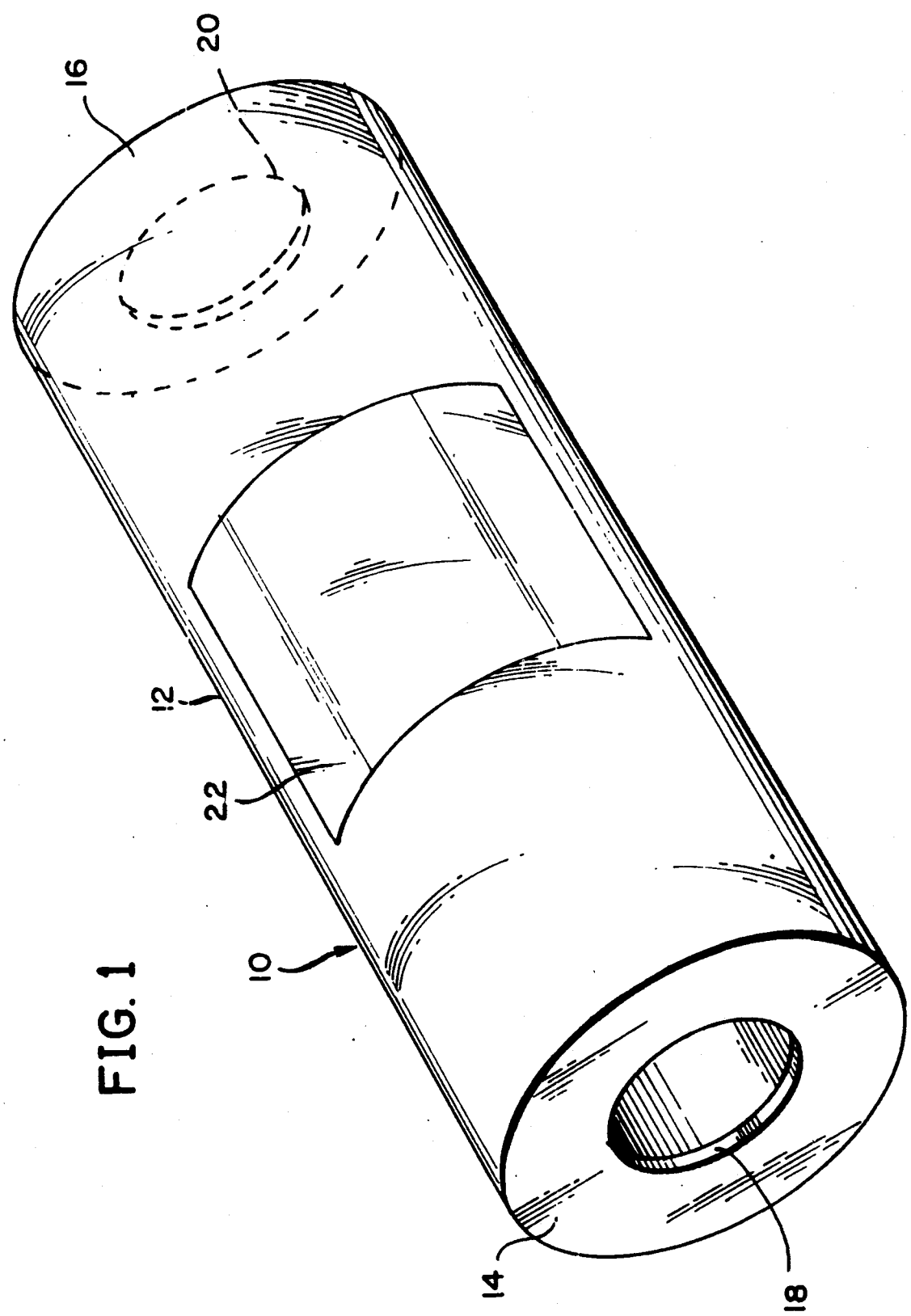
FIG. 1 is a perspective view of a typical scanning drum.

FIG. 1 is a perspective of scanner drum 10. Scanner drum 10 is cylindrical in shape having a clear plastic outer surface 12 and two substantially planar end walls 14 and 16. End walls 14 and 16 serve as the mounting plates for positioning the scanner drum on the scanning apparatus itself. As such, there are two apertures 18 and 20 centrally positioned in end walls 14 and 16. The transparency 22 which is to be scanned by the scanning apparatus is positioned on the outer surface of cylindrical sidewall 12. The scanner drum 10 is then positioned on the scanning apparatus by means of apertures 18 and 20 and end walls 14 and 16 and the optical scanner transfers the image from the transparency 22 to a separate proof. A comparison of transparency 22 and the separate proof is then required. The operator either removes the transparency 22 to make the comparison or attempts to make the comparison by removing scanner drum 10 and holding it up to a 5000 K light source and viewing the transparency in comparison to the proof which is held under a 5000 K light source.

The standard scanner drum configuration is approximately 30 inches in length and approximately 8 inches in diameter. The plastic or glass sidewall 12 is approximately ⅛ inch thick and the mounting apertures 18 and 20 in end walls 14 and 16 are approximately 3½ inches in diameter. The operator's attempt to compare the transparency 22 to the proof by holding the scanner drum to a 5000 K light source introduces distortion as a result of the thickness of the cylindrical sidewall 12 and the distance to the light source. Therefore, the formerly optimum comparison was accomplished by removing the transparency 22 and placing it under a 5000 K light source. If color adjustments were required, the transparency 22 would have to be repositioned on scanner drum 10 and the coordinates for the optical scanning assembly reset in order to scan the transparency and generate a second proof. The operator's attempt to make the comparison by means of holding the scanner drum with the transparency attached to the 5000 K light source obviated the need for resetting the coordinates, but did not result in an accurate comparison.

Figure 2:
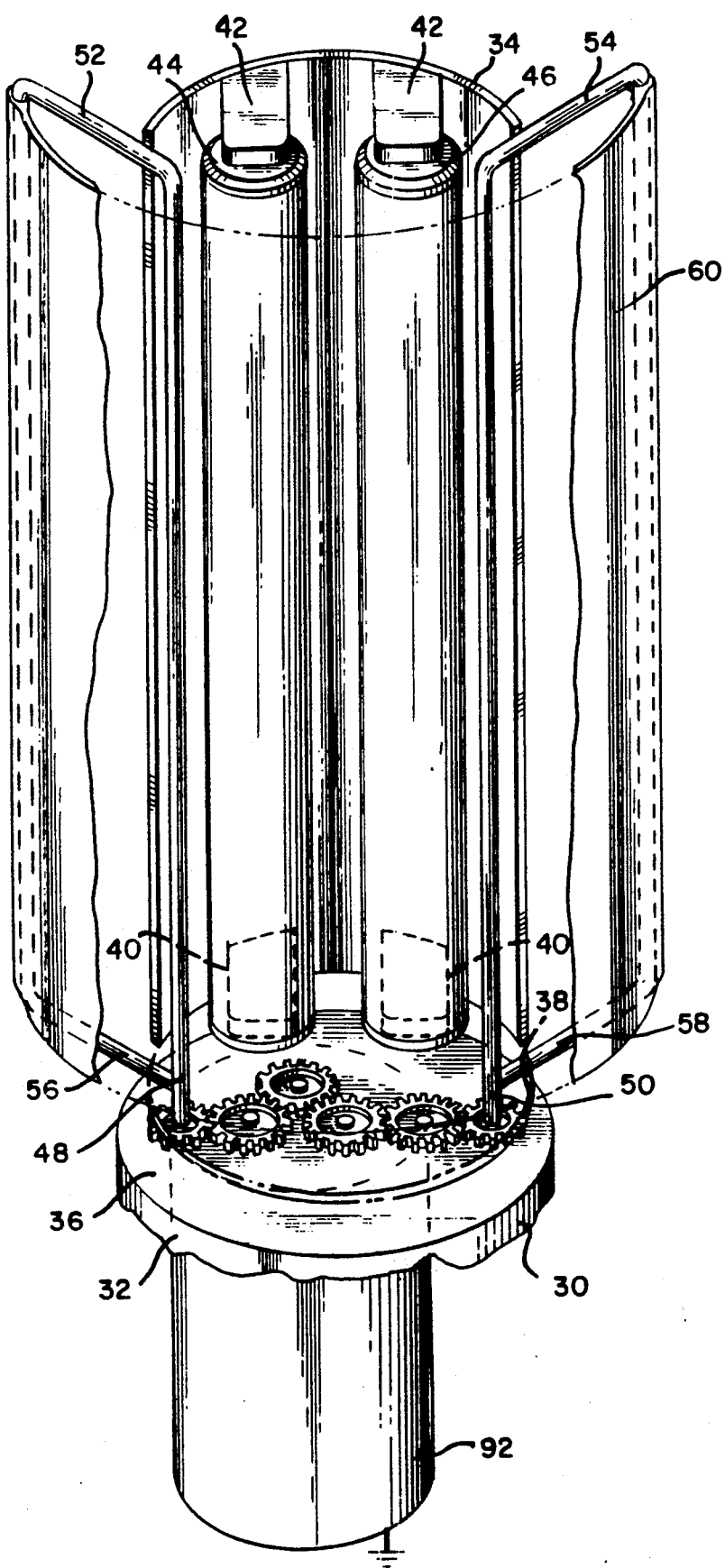
FIG. 2 is a side elevational view of the light source assembly in a open position for positioning within the scanning drum.

Referring to FIG. 2, there is a side elevational view of the light source assembly shown in an open position. The light source assembly comprises a housing 30 having a tubular enclosed first end 32 and a second end 34 which is substantially longitudinally bisected so as to present a semi-cylindrical tubular wall. Positioned in first end 32 is a gear mounting plate 36 which provides a base for the gear drive assembly which is operated either electrically or manually and which is described hereafter. Positioned above gear mounting plate 36 is a first light source mounting plate 38. Positioned on plate 38 are a plurality of electrical connectors 40 which cooperate with a plurality of electrical connectors 42 secured to the top of second end 34 of tubular housing 30. These electrical connections 40 and 42 are designed to receive in a snap-fit manner, a 5000 K light bulb 44 and 46. In the embodiment as shown, two (2) 5000 k light sources are shown within the housing. It will be recognized by those skilled in the art that in certain circumstances, a single 5000 K bulb will suffice and in other instances, more than two (2) 5000 K bulbs will be required. The number of bulbs to be utilized will be dictated by the size of the scanner drum 10 and the ingress and egress apertures 18 and 20 associated with mounting plates 14 and 16 of scanner drum 10.

Secured to gear mounting plate 36 in a rotatable fashion are two lens shafts 48 and 50. Lens shafts 48 and 50 extend upwardly from gear mounting plate 36 to the top of second end 34 of tubular housing 30. Lens shafts 48 and 50 cooperate with the drive mechanism described hereafter to rotate about their axis. Secured to the upper and lower ends of lens shafts 48 and 50 are four lens arms 52, 54, 56, and 58, respectively. Lens arms 52, 54, 56 and 58 cooperate with lens shafts 48 and 50 and rotate in conjunction therewith. There is secured between the outer ends of lens arms 52, 54, 56 and 58, a flexible diffused plastic lens 60. Lens 60 is sufficiently resilient to allow lens shafts 48 and 50 to rotate to a closed position thus contracting lens 60 and to then rotate to an open position thus expanding lens 60 into a substantially semi-cylindrical position approximating the interior radius of scanning drum 10. This configuration can best be seen with reference to FIGS. 3 and 4.

Figure 3:
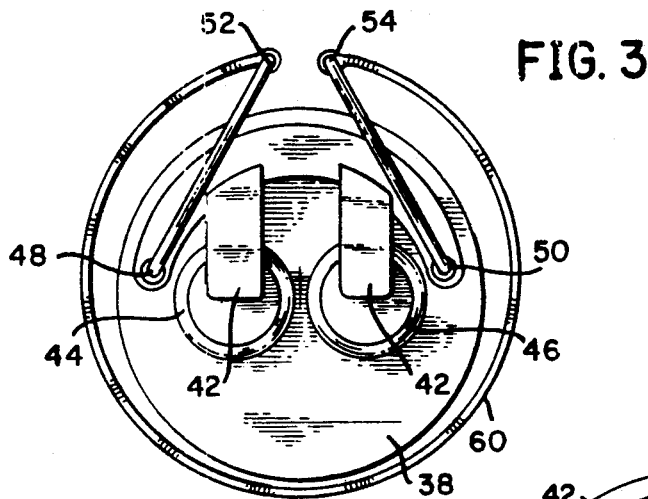
FIG. 3 is a top view of the light source assembly in the closed position.
Figure 4:
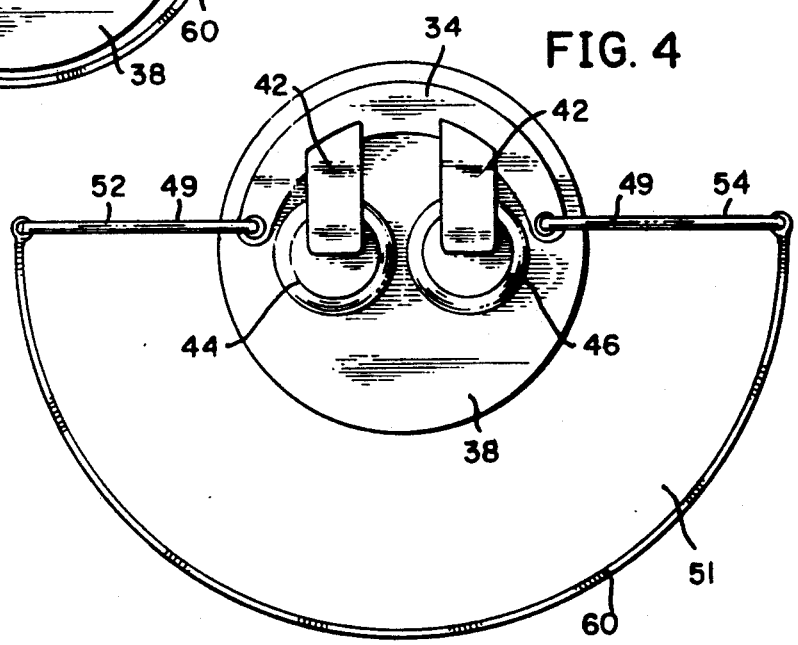
FIG. 4 is a top view of the light source assembly in an open position.

FIG. 3 illustrates a top view of the light source assembly in the closed position and FIG. 4 illustrates a top view of the light source assembly in the opened position. Referring to FIG. 3, it can be seen that lens arms 52 and 54 and their corresponding lens arms 56 and 58, not shown, have been rotated on lens shafts 48 and 50, thus drawing or contracting flexible diffused plastic lens 60 into a substantially circular configuration about tubular housing 30. In this closed configuration, the light source assembly is capable of being inserted through aperture 18 or aperture 20 in the scanner drum, thus positioning the light source assembly within the scanner drum.

FIG. 4 illustrates the expansion of flexible diffused plastic lens 60. In this configuration, lens shafts 48 and 50 have rotated thus causing lens arms 52, 54, 56 and 58 to assume an extended position 180° apart. In doing so, flexible diffused plastic lens 60 has expanded its radius to assume the radially configuration of the interior scanner drum 10. Second end 34 of housing 30 presents a solid, longitudinal partition behind 5000 K light bulbs 44 and 46. In order to ensure that the light from 5000 K bulbs 44 and 46 is directed only through flexible diffused plastic lens 60, and that no stray indirect undiffused light is directed on the transparency positioned on the outer surface of scanner drum 10, a flexible bellows or hood 49 is positioned between lens arms 52 and 54 and between lens arms 56 and 58. These bellows would extend from the outer ends of lens arms 52, 54, 56 and 58 to the inner end of the lens arms secured to second end 34 of housing 34. An additional flexible bellows 51 would extend in a semi-circular manner between lens arm 52 and lens arm 54 and lens arm 56 and lens arm 58. The bellows would effectively seal and secure the 5000 K light bulbs 44 and 46 between the bellows and flexible diffused plastic lens 60. The bellows material could be of the same flexible diffused plastic as lens 60 or of a darker material. Its flexibility would be such that it would fold upon itself when flexible diffused plastic lens 60 was in the closed position as illustrated in FIG. 3, and extend itself when flexible diffused plastic lens 60 was in the opened position as illustrated in FIG. 4.

Figure 5:
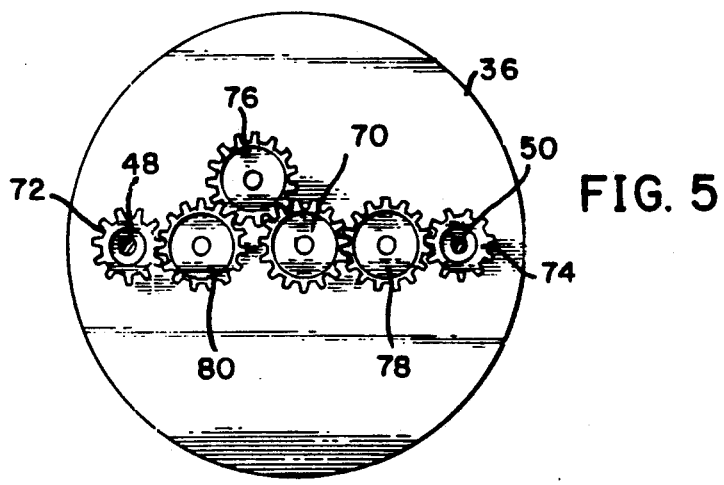
FIG. 5 is a cutaway view of the gear mechanism.

Referring to FIG. 5, there is shown a perspective cutaway view of gear mounting plate 36. Gear mounting plate 36 has positioned rotatably thereon, main drive gear 70, in communication with motor 92. Main drive gear 70 drives or rotates lens shaft gears 72 and 74 by means of intermediate gears 76, 78 and 80. Main drive gear 70 is in direct communication with intermediate gear 76 and 78 and intermediate gear 78 is in communication with a second intermediate gear 80 which is a counter gear for correcting the rotation of its respective lens shaft. In this configuration, the rotation of main drive gear 70 in one direction opens flexible diffused plastic lens 60 by causing the rotation of lens shafts 48 and 50 and the corresponding lens arms 52, 54, 56 and 58. Rotation in the opposite direction by main drive gear 70 would close or collapse flexible diffused plastic lens 60 into its closed position. The gear assembly illustrated in FIG. 5 is but one embodiment of the manner in which the lens may be retracted and expanded. Alternative embodiments, including the use of two drive gears and two motors or the manual manipulation of the gear assembly, are possible without separating from the spirt and scope of the invention.

Figure 6:
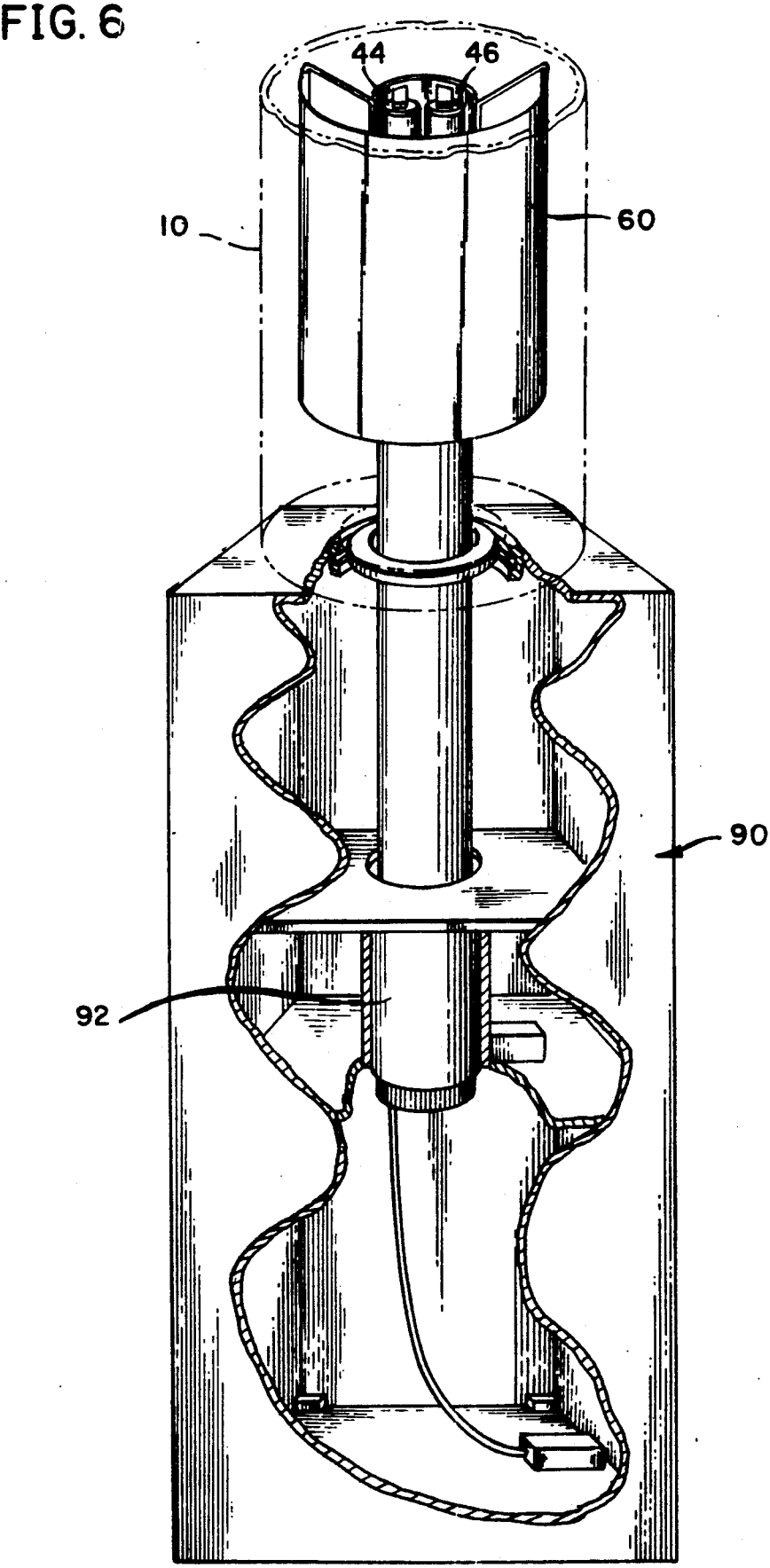
FIG. 6 is a side elevational view of an automatic assembly for operation of the light source assembly.

In the configuration as shown, the light source assembly could be operated in a hand-held manner using a rotatable gear drive at lower end 32 of housing 30. The operator could position the light source in a closed position within scanner drum 10 and then manually open flexible plastic diffused lens 60. A more desirable manner for the insertion of the light source assembly into scanner drum 10 which could be accomplished in a repetitive manner and reduce the likelihood of damage to the light source assembly is accomplished by having the light source assembly mechanically and electrically inserted into scanner drum 10 and then opened. This would be accomplished by means of mounting the light source assembly within a housing as disclosed in FIG. 6 whereby the scanner drum can be removed from the scanning apparatus and positioned on housing 90. Aperture 18 or 20 on scanner drum 10 would be aligned with an aperture of similar configuration on housing 90. The light source assembly in a closed position would then be mechanically or electrically inserted into scanner drum 10 to the desired position.

An electric motor 92 would then be activated to rotate main drive gear 70 and open flexible diffused plastic lens 60. Electrical energy could then be communicated to 5000K bulbs 44 and 46, thus illuminating the transparency from the interior of the scanner drum and the operator could make the necessary comparison between the transparency and the proof without removing the transparency from the scanner drum. If color corrections are required, the electrical energy to the 5000K bulbs 44 and 46 would be interrupted, motor 92 would close flexible diffused plastic lens 60 and the light source assembly would be withdrawn electronically or mechanically from scanner drum 10. Scanner drum 10 would then be placed on the scanning apparatus and the necessary corrections in color accomplished in order to generate a second proof. A second comparison between the transparency and the proof would be made in the manner set forth aforesaid.

Applicant's apparatus and method, whether utilized in a hand-held manner or in an electro-mechanical automatic mode, provides for an accurate and efficient comparison between a transparency and the proof, and subsequent copies made from the transparency. The time involved in making the comparison between the transparency and the proof will be greatly reduced and the time from scanning the transparency to generating an accurate proof for printing will be greatly reduced. This savings is accomplished while still allowing the operator the ability to make the comparison utilizing the standard light source for the industry.

While the present invention has been described in connection with the exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

I claim:

1. A light source assembly for use in cooperation with a scanner drum for viewing transparencies secured to the outer surface of said scanner drum, said light source assembly comprising:
    a housing, generally longitudinally cylindrical in shape for insertion into said scanner drum;
    a light source removably secured to said housing, said light source comprising an industry standard light source for viewing said transparencies;
    a retractable, flexible lens secured to a plurality of support shafts positioned generally parallel with said light source on said housing, said support shafts having a plurality of support arms extending perpendicularly therefrom for securing said lens and disposing said lens from a retracted closed position between said light source and said scanner drum;
    a means for retracting said lens to a closed retracted position and expanding said lens to an open position, said means comprising a drive gear and gear assembly secured in said housing in communication with said support shafts, said support shafts mounted on said gear assembly and retractable therewith thereby retracting and expanding said lens, said lens, when in said expanded position, proximates the diameter of the interior or said scanner drum for viewing said transparencies on said outer surface of said scanner drum.

2. A light source assembly in accordance with claim 1 wherein said means for retracting and expanding said lens comprises the manual rotation of said gear assembly.

3. A light source assembly in accordance with claim 1 wherein said means for retracting said lens and expanding said lens comprises at least one synchronous electric motor in communication with said gear assembly.

4. A light source assembly in accordance with claim 1 wherein a flexible bellows is secured between said support shaft and support arms to direct the illumination from the light source through said lens.

5. A light source assembly in accordance with claim 4 wherein said bellows is comprised of a diffused material.

6. A method for viewing transparencies in the graphic arts industry wherein said transparencies are mounted on the circumference of a scanner drum from which a proof is electronically generated, the method allowing the viewing of said transparencies without removal of said transparencies from the scanner drum, the method comprising:

mounting a light source on a tubular frame, said tubular frame dimensioned to be inserted through sidewall apertures of said scanner drum;

positioning on said tubular frame, a flexible diffused lens, said lens retractable to a closed position to permit insertion of said tubular frame and said lens into said scanner drum, said lens movable to an expanded open position once positioned inside said scanner drum;

inserting said tubular frame and said lens in said retracted position into said scanner drum;

expanding said lens from said retracted position to said expanded position between said light source and said circumference of said scanner drum, said circumference of said scanner drum having mounted thereon said transparencies;

engaging said light source with electrical energy thus illuminating said light source and providing illumination from behind said transparencies.

7. A method in accordance with claim 6 wherein said light source comprises at least one 5000 Kelvin bulb for illumination.

8. A method in accordance with claim 6 wherein said lens is manually retractable and expandable.

9. A method in accordance with claim 6 wherein said lens is electromagnetically retractable and expandable.

10. A method in accordance with claim 6 wherein a bellows is positioned between said tubular frame and the perimeter of said flexible lens to ensure the illumination of said light source is directed through said flexible lens.

* * * * *